United States Patent [19]
Ruland et al.

[11] 3,907,911
[45] Sept. 23, 1975

[54] 1,2,3,4-TETRABROMO-1,4-DICHLORO-1,3-BUTADIENE AND A PROCESS FOR ITS PRODUCTION

[75] Inventors: Norman L. Ruland, Conroe; David G. Walker, Baytown, both of Tex.

[73] Assignee: Tenneco Chemicals, Inc., Saddle Brook, N.J.

[22] Filed: Jan. 22, 1973

[21] Appl. No.: 325,824

[52] U.S. Cl. .............................. 260/655; 260/654 R
[51] Int. Cl.² ........................................ C07C 21/20
[58] Field of Search ..................... 260/655, 654 R

[56] References Cited
UNITED STATES PATENTS

| | | | |
|---|---|---|---|
| 2,950,330 | 8/1960 | Duggins | 260/654 R |
| 3,020,309 | 2/1962 | Luvisi | 260/654 R |
| 3,121,753 | 2/1964 | Luvisi et al. | 260/654 R |

FOREIGN PATENTS OR APPLICATIONS

| | | | |
|---|---|---|---|
| 333,946 | 8/1930 | United Kingdom | 260/654 R |

OTHER PUBLICATIONS

Straus et al., Ber. 63B, 1886–1899, (1930).

Primary Examiner—Delbert E. Gantz
Assistant Examiner—Joseph A. Boska
Attorney, Agent, or Firm—Evelyn Berlow

[57] ABSTRACT

Dichlorodiacetylene is brominated in an inert solvent to produce 1,2,3,4-tetrabromo-1,4-dichloro-1,3-butadiene. This compound, which contains 89% of halogen, is useful as a flame retardant and plasticizer for resinous materials.

7 Claims, No Drawings

1,2,3,4-TETRABROMO-1,4-DICHLORO-1,3-BUTADIENE AND A PROCESS FOR ITS PRODUCTION

This invention relates to 1,2,3,4-tetrabroma-1,4-dichloro-1,3-butadiene and to a process for its production.

Polyhalogenated paraffinic and olefinic hydrocarbons have combinations of properties that make them valuable in a number of industrial applications. Some of these compounds are high density oils that are useful as flame-retardant hydraulic fluids and as ore flotation liquids, while others find their major use as flame-retardant plasticizers for resinous materials.

In the past these polyhalogenated compounds have been manufactured by processes in which bromine or chlorine atoms are substituted for hydrogen atoms in the appropriate hydrocarbon. It has been recognized that direct halogenation of acetylenic compounds is a much less expensive route to these compounds, but it has been difficult to carry out these addition reactions because diacetylene, vinylacetylene, methylacetylene, and other acetylenic compounds are difficult to handle and to store since they tend to detonate on compression.

Straus, et al., reported (Ber. 63B, 1886–99 (1930)) that when diacetylene is introduced into an aqueous hypohalite solution the corresponding dihalodiacetylene is formed and that when the unstable dihalodiacetylenes are further halogenated halogen adds symmetrically to form hexahalo-1,3-butadienes. They reported that homogeneous polyhalogenated products are obtained only when the entering halogen is the same as that already in the dihalodiacetylene; that is, the bromination of dibromodiacetylene yields a single hexabromo-1,3-butadiene, whereas the reaction of dibromodiacetylene with iodine yields a mixture of isomeric tetraiododibromo-1,3-butadienes. Both the hexabromo-1,3-butadiene and the 1,4-dibromo-1,2,3,4-tetraiodo-1,3-butadiene that were prepared by Straus et al. were crystalline solids, the hexabromo compound melting at 52°–54°C. and the dibromotetraiodo compound melting at 160°–162°C. (prisms) and at 128°–130°C. (needles). Because of their relatively high melting points, these compounds are of little value as flame-retardant plasticizers for resinous materials.

In accordance with this invention, it has been found that when dichlorodiacetylene is brominated, the product obtained is a stable, colorless and odorless liquid that is an excellent fire-retardant plasticizer for polyurethane foams and other resinous materials.

In the process of this invention, a solution of dichlorodiacetylene in an inert organic solvent is contacted with bromine at a temperature in the range of 0°C. to 80°C. until about 4 gram atoms of bromine has reacted per mole of dichlorodiacetylene. The solution to which bromine is added is a 0.1 molar to 2.0 molar solution of dichlorodiacetylene in an organic solvent that is substantially inert to bromination, such as chloroform, carbon tetrachloride, bromoform, carbon tetrabromide, hexane, and heptane. Best results have been obtained when bromine was added to a 0.5 molar to 1.5 molar solution of dichlorodiacetylene in carbon tetrachloride at a temperature in the range of 25°C. to 60°C. The bromination may be carried out by any suitable and convenient procedure. For example, a 0.1 N to 1.0 N solution of bromine in carbon tetrachloride may be added to the dichlorodiacetylene solution until the bromine color remains for 2-3 minutes. The bromination of dichlorodiacetylene takes place rapidly and gives a nearly quantitative yield of 1,2,3,4-tetrabroma-1,4-dichloro-1,3 butadiene. Upon removal of the solvent and any unreacted bromine, there is obtained a light red oil that is non-volatile at ambient temperature and that has a density of about 2.45 grams per milliliter and a total halogen content of 89%.

In a preferred embodiment of this invention, the dichlorodiacetylene that is brominated to form the novel polyhalogenated compound is prepared by contacting a gas stream that contains at least 1 mole percent of diacetylene with an aqueous solution of an alkali metal hypochlorite at a temperature in the range of about −10°C. to 20°C. When the reaction between diacetylene and either sodium hypochlorite or potassium hypochlorite is carried out at about 0°C., a quantitative yield of dichlorodiacetylene is obtained. Particularly satisfactory results have been obtained when the starting material used in the preparation of dichlorodiacetylene was a gas stream that contained 20 mole percent to 40 mole percent of diacetylene, 0 to 30 mole percent of other acetylenic compounds having 3 or 4 carbon atoms, and 30 mole percent to 80 mole percent of inert compounds, such as n-butane, nitrogen methylene dichloride, and mixtures thereof. When these gas streams are contacted with an aqueous alkali metal hypochlorite solution, the diacetylene is dichlorinated rapidly and quantitatively, and the other acetylenic components of the gas stream are chlorinated only to a minor extent.

The mixtures of acetylenic compounds and inert diluents that are ordinarily and preferably used as the starting material in the process of this invention are the gas streams that result when acetylene has been removed from gas streams obtained by the high temperature pyrolysis of hydrocarbons. In addition to providing an inexpensive source of diacetylene, the use of these mixtures provides a way of rendering harmless diacetylene and other unstable acetylenic compounds that are difficult to handle and to store.

The gas streams that are obtained by stripping acetylene from a hydrocarbon pyrolysis gas, scrubbing the acetylene with oil, and stripping the oil with nitrogen or another inert gas generally contain about 1 mole percent to 10 mole percent of diacetylene, vinylacetylene, and methylacetylene. Gas streams that contain higher concentrations of these compounds, that is, 20 percent or more of C3-4 acetylenic compounds, can be obtained by passing a gas stream that contains 10 percent or less of these acetylenic compounds through a bed of activated carbon until the carbon is saturated with C3 and C4 acetylenic compounds and then displacing these compounds by passing an inert gas, which is preferably a mixture of nitrogen, n-butane, and methylene chloride, through the carbon bed. In this way gas streams that contain 20 mole percent to 40 mole percent of diacetylene, 0 to 30 mole percent of vinylacetylene and/or methylacetylene, and 30 mole percent to 80 mole percent of inert compounds are obtained. A procedure for the preparation of a gas stream that contains a sizeable and nonexplosive concentration of C3 and C4 acetylenic compounds is described in detail in application Ser. No. 91,567, which was filed on Nov. 20, 1970 by David G. Walker and Donald A. Keyworth and which is now U.S. Pat. No. 3,706,181.

Following the reaction of the diacetylene with an alkali metal hypochlorite in an aqueous solution, the dichlorodiacetylene that is formed is separated from the aqueous reaction mixture by extraction with chloroform, carbon tetrachloride, bromoform, carbon tetrabromide, hexane, heptane, or another organic solvent that is substantially inert ot bromination. The resulting solution can be used without purification or other treatment in the bromination step of the process of this invention.

The invention is further illustrated by the following examples.

Example 1

To a 1.15 molar solution of dichlorodiacetylene in carbon tetrachloride was added dropwise a 0.2 N solution of bromine in carbon tetrachloride until the bromine color remained for 2–3 minutes. During the addition of the bromine solution, the temperature of the reaction mixture was maintained at 25°–30°C. by means of external cooling. When the addition of bromine had been completed, the mixture was allowed to stand under ambient conditions until the solvent had evaporated.

There was obtained a light red oil that was not volatile at ambient temperature. It had a density of 2.44 grams per mililiter, a hydrogen content of less than 1%, a bromine content of 74%, and a total halogen content of 89%. Analysis of the product by liquid phase chromatography indicated that it contained 1,2,3,4-tetrabromo-1,4-dichloro-1,3-butadiene and a very small amount of reaction by-products.

Example 2

When the procedure described in Example 1 was repeated using a 0.7 molar solution of dichlorodiacetylene in n-hexane, similar results were obtained.

Example 3

To 600 milliliters of a 1.94 molar sodium hypochlorite aqueous solution at 0°C. was added 100 milliliters of a gas mixture that contained 30.6 mole percent of diacetylene, 20.2 mole percent of vinylacetylene, and 49.2 mole percent of n-butane. The reaction mixture was stirred at 0°C. for 3 hours. At the end of this time, it was found that more than 85% of the diacetylene had been chlorinated.

Dichlorodiacetylene was extracted from the aqueous solution with 250 milliliters of carbon tetrachloride. The resulting solution contained 0.38 mole of dichlorodiacetylene.

A solution of bromine in carbon tetrachloride was added dropwise to the 1.51 molar solution of dichlorodiacetylene in carbon tetrachloride until the bromine color did not disappear in 2–3 minutes. During the addition of the bromine solution, the temperature of the reaction mixture was maintained at 25°–30°C. by means of external cooling. When the addition of bromine had been completed, the reaction mixture was allowed to stand under ambient conditions until the solvent had evaporated. There was obtained 32.3 grams of a light red oil that was shown by analysis to be 1,2,3,4-tetrabromo-1,4-dichloro-1,3-butadiene.

Example 4

To 500 milliliters of a 1.15 molar potassium hypochlorite -4 molar potassium hydroxide aqueous solution at 0°C. was added 20 milliliters of n-hexane and then 15 milliliters of a gas mixture that contained 31 mole percent of diacetylene, 5 mole percent of vinylacetylene, and 64 mole percent of n-butane. The reaction mixture was stirred at 0°C. for 4 hours. At the end of this time, it was found that more than 85% of the diacetylene had been chlorinated.

Dichlorodiacetylene was extracted from the aqueous solution with n-hexane.

A solution of bromine in carbon tetrachloride was added dropwise to the n-hexane solution until the bromine color did not disappear in 2–3 minutes. During the addition of the bromine solution, the temperature was maintained at 30°–35°C. by means of external cooling. When the addition of bromine had been completed, the reaction mixture was allowed to stand under ambient conditions until the solvent had evaporated.

The light red oil that was obtained had a density of 2.44 grams per mililiter, molecular weight of 413, and a total halogen content of 14.6 g. me. per gram (calculated for $C_4Br_4Cl_2$, molecular weight, 439 and total halogen content, 13.7 g. me. per gram). It was shown by infrared analysis to be 1,2,3,4-tetrabromo-1,4-dichloro-1,3-butadiene that contained a small amount of halogenated olefinic and paraffinic compounds derived from the vinylacetylene that was present in the original gas mixture.

Example 5

When the procedure described in Example 4 was repeated using a 0.255 molar potassium hypochlorite-8molar potassium hydroxide aqueous solution as the starting material, a similar product was obtained.

What is claimed is:

1. 1,2,3,4-Tetrabromo-1,4-dichloro-1,3-butadiene.

2. The process for the production of 1,2,3,4-tetrabromo-1,4-dichloro-1,3-butadiene that comprises contacting dichloro-diacetylene with bromine in an organic solvent that is substantially inert to bromination at a temperature in the range of 25°C. to 60°C. until about 4 gram atoms of bromine has reacted per mole of dichlorodiacetylene, thereby forming a solution of 1,2,3,4-tetrabromo-1,4-dichloro-1,3-butadiene in said solvent, and recovering 1,2,3,4-tetrabromo-1,4-dichloro-1,3-butadiene by removing the solvent and any unreacted bromine from said solution.

3. The process of claim 2 wherein the organic solvent is carbon tetrachloride.

4. The process of claim 2 wherein the solution that is contacted with bromine is a 0.1 molar to 2.0 molar solution of dichlorodiacetylene in carbon tetrachloride.

5. The process for the production of 1,2,3,4-tetrabromo-1,4-dichloro-1,3-butadiene that comprises the steps of a. contacting a gas stream that contains 20 to 40 mole percent of diacetylene, 0 to 30 mole percent of an acetylenic compound selected from the group consisting of methylacetylene, vinylacetylene, and mixtures thereof, and 30 to 80 mole percent of compounds that are substantially inert to bromination with an aqueous solution of an alkali metal hypochlorite at a temperature in the range of −10°C. to 20°C. to form an aqueous reaction mixture containing dichlorodiacetylene;

b. extracting dichlorodiacetylene from the aqueous reaction mixture with an organic solvent that is substantially inert to bromination to form a 0.1 molar to 2.0 molar solution of dichlorodiacetylene in said solvent;

c. contacting said solution with bromine at a temperature in teh range of 0°C. to 80°C. until about 4 gram atoms of bromine has reacted per mole of dichlorodiacetylene, thereby forming a solution of 1,2,3,4-tetrabromo-1,4-dichloro-1,3-butadiene in said solvent, and d. recovering 1,2,3,4-tetrabromo-1,4-dichloro-1,3-butadiene from said solution.

6. The process of claim 5 wherein in Step (b) the organic solvent is carbon tetrachloride.

7. The process of claim 5 wherein the solution that is formed in Step (b) is a 0.5 molar to 1.5 molar solution of dichlorodiacetylene in carbon tetrachloride.

* * * * *

UNITED STATES PATENT OFFICE
CERTIFICATE OF CORRECTION

PATENT NO. : 3,907,911
DATED : September 23, 1975
INVENTOR(S) : Norman L. Ruland and David G. Walker It is certified that error appears in the above-identified patent and that said Letters Patent are hereby corrected as shown below:

Column 1, line 5, change "1,2,3,4-tetrabroma-1,4-" to
-- 1,2,3,4-tetrabromo-1,4- --.

Column 1, line 26, delete the commas (,) after "Straus" and after "al.".

Column 2, line 4, change "1,2,3,4-tetrabroma-1,4-" to
-- 1,2,3,4-tetrabromo-1,4- --.

Column 3, line 7, change "ot" to -- to --.

Column 5, line 4, change "teh" to -- the --.

Signed and Sealed this second Day of December 1975

[SEAL]

Attest:

RUTH C. MASON
Attesting Officer

C. MARSHALL DANN
Commissioner of Patents and Trademarks